No. 707,550. Patented Aug. 26, 1902.
G. H. CHINNOCK.
SELF HEALING MATERIAL.
(Application filed Apr. 24, 1896.)
(No Model.)
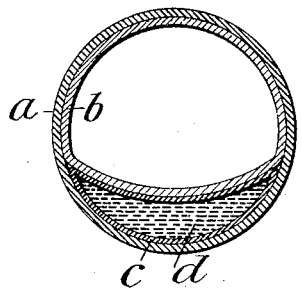
Witnesses:
Inventor:
George H. Chinnock
By Dickerson Brown & Raegener
His Attorneys

UNITED STATES PATENT OFFICE.

GEORGE H. CHINNOCK, OF BROOKLYN, NEW YORK, ASSIGNOR, BY DIRECT AND MESNE ASSIGNMENTS, TO J. J. NICHOLS AND H. H. JANDORF, OF NEW YORK, N. Y., AND S. S. RYCKMAN, OF GRIMSBY, ONTARIO, CANADA.

SELF-HEALING MATERIAL.

SPECIFICATION forming part of Letters Patent No. 707,550, dated August 26, 1902.

Application filed April 24, 1896. Serial No. 588,869. (No specimens.)

*To all whom it may concern:*

Be it known that I, GEORGE H. CHINNOCK, a citizen of the United States, residing in the city of Brooklyn, county of Kings, and State of New York, have invented a new and useful Self-Healing Material, of which the following is a specification, reference being had to the accompanying drawing, forming a part of the same, wherein for convenience I have adapted my invention to an ordinary hose-pipe tire, *a* and *b* representing layers of rubber held together by the usual layer of thin fabric and cement. For convenience I have separated the inner layer from the fabric to form a pocket for the tube *c*, containing the self-healing material *d*. The illustration represents a section of a tire when inflated.

Heretofore in compounds used in connection with pneumatic tires to insure self-healing properties great difficulty has been experienced owing to atmospheric changes and also to the fact that after a time the compound would harden, stripping it of its function and at the same time detracting from the elasticity of the tire itself.

The object of my invention is to eliminate the difficulties hereinbefore set forth and to produce a lasting compound operative under all atmospheric changes. I have found that a basis of vegetable gums with suitable material to give the same body and an addition of oils when used in suitable proportions will produce such a compound.

To more particularly describe the various changes in my compound, I would say that gum-caoutchouc remains the only fixed vegetable gum, and under certain circumstances I employ any suitable resinous gum, asphaltum, tar, or camphor-gum. As oils I employ the fatty oils, the carbon oils, and the volatile oils, such as naphtha, benzin, or ether.

To practically apply my compound to a pneumatic tire, I would employ gum-caoutchouc, a resinous gum, wax, sulfur, and one of the volatile oils, grind until thoroughly mixed, hermetically seal in a thin layer of rubber, and vulcanize into the tread of the tire. The action of the compound here given is peculiar. As soon as a puncture has been made in a tire and the instrument of puncture removed the compressed air coming in contact with the walls of the puncture hardens said walls by the evaporation of the volatile oil and forms a plug that is forced into the outer tread portion, and a hardened plug is formed over the inner mouth of the puncture, completely sealing the tire. For mackintoshes, hot-water bags, and rubber boots or similar articles I would hermetically seal a layer of a compound consisting of gum-caoutchouc, wax, a fatty oil, and a volatile oil ground and mixed.

The proportions preferred in the pneumatic-tire compound and found to operate practically under all conditions are: gum-caoutchouc, seventy per cent.; resinous gum, ten per cent.; wax, nine per cent.; sulfur, one per cent.; volatile oil, ten per cent.

The compound as adapted to mackintoshes, rubber boots, hot-water bags, and the like operates in a manner similar to the compound relating to pneumatic tires; but the proportions of all the ingredients except the first would be changed owing to the fact that only atmospheric pressure is available.

Having now described my invention, what I claim, and desire to secure by Letters Patent, is—

A composition of matter, consisting of a pasty mass of gum-caoutchouc, wax, resinous gums and volatile oils in suitable proportions, hermetically sealed between layers of rubber and inserted within the walls of the article in which it is to be used, in substantially the manner set forth.

GEORGE H. CHINNOCK.

Witnesses:
FREDERIC J. PECK,
FRANK L. ZABRISKIE.